United States Patent
McElroy et al.

[11] 3,924,454
[45] Dec. 9, 1975

[54] MULTI-FREQUENCY ULTRASONIC TESTING SYSTEM

[75] Inventors: Jerry T. McElroy, Danbury; Sidney Soloway, Wilton, both of Conn.

[73] Assignee: Automation Industries, Inc., Los Angeles, Calif.

[22] Filed: Oct. 24, 1973

[21] Appl. No.: 409,078

[52] U.S. Cl............................................. 73/67.8 R
[51] Int. Cl.²........................................ G01N 29/04
[58] Field of Search............ 73/67.8 R, 67.8 S, 67.9, 73/71.5 US

[56] References Cited
UNITED STATES PATENTS

| | | | |
|---|---|---|---|
| 3,274,821 | 9/1966 | Weighart............................. | 73/67.8 |
| 3,292,018 | 12/1966 | Clynes............................... | 73/67.8 R |
| 3,309,914 | 3/1967 | Weighart............................. | 73/67.9 |
| 3,616,682 | 11/1971 | Golis et al......................... | 73/71.5 US |
| 3,667,287 | 6/1972 | Furon................................ | 73/67.9 |

*Primary Examiner*—Richard C. Queisser
*Assistant Examiner*—Stephen A. Kreitman
*Attorney, Agent, or Firm*—Dan R. Sadler

[57] ABSTRACT

An ultrasonic nondestructive testing system is provided for accurately inspecting workpieces having a large amount of acoustical attenuation. The system is adapted to simultaneusly resolve with a high degree of accuracy small defects on or very near the entrant surface of the workpiece and defects at great depths within the workpiece. The system includes means for intermittently transmitting a train of pulses of ultrasonic energy into the workpiece and receiving echoes of the pulses reflected from the workpiece. The train of pulses are divided into two or more series of pulses. The pulses in the different series are distinguishable from each other and adapted to penetrate into different regions of the workpiece and be reflected therefrom. By way of example, the pulses in one series have a higher frequency while the pulses in another series has a lower frequency. The high frequency pulses are effective to provide a high degree of resolution for small defects on or very near the entrant surface of the workpiece. The low frequency pulses are effective to penetrate deeply into the workpiece for resolving defects situated in the interior of the workpiece. In addition, means are provided for combining the received signals corresponding to the low and high frequencies to provide a single CRT display signal corresponding to the entire thickness of the workpiece.

7 Claims, 9 Drawing Figures

MULTI-FREQUENCY ULTRASONIC TESTING SYSTEM

BACKGROUND

One means of inspecting workpieces for internal defects is to utilize an ultrasonic nondestructive testing system. In one form of such a system an electromechanical search unit transmits ultrasonic energy into the workpiece. Varying amounts of the ultrasonic energy are reflected from various internal discontinuities within the workpiece back to the search unit which produces a corresponding electrical signal. The ability to resolve the size and position of a defect is a function of the wavelength of the ultrasonic energy. Accordingly, in order to accurately resolve small defects, it is necessary to utilize a high frequency. For example, a frequency of 10 to 25 megacycles may be employed.

However, the ability to resolve defects that are buried deep within the workpiece is limited by the amount of attenuation experienced by the ultrasonic energy as it propagates through the workpiece. The attenuation or losses within the material are also a function of the wavelength; the shorter the wavelength the greater the attenuation losses. In some materials, such as stainless steel, titanium, Inconel, Rene', Monel, etc., the attenuation losses are very high. As a consequence, in order to inspect materials of this variety having a thickness in excess of approximately two or three inches, it is necessary to utilize relatively low frequencies, for example, in the range of about one to three megacycles. Such low frequencies do permit inspecting such workpieces at very substantial depths. However, at the same time it greatly diminishes the ability to resolve small defects and particularly those situated on or near the front surface of the workpiece.

As a consequence, it can be seen there is a trade-off or compromise between the ability to resolve small defects on or near the surface as opposed to defects situated at greater depths within the workpiece.

Historically, it has been necessary to successively inspect critical workpieces such as turbine wheels, etc., at different frequencies. A low frequency has been used for penetrating all the way to the rear of the workpiece, and a high frequency has been used to inspect the surface and the region just below the surface. This has provided an ability to adequately inspect the workpiece. However, the repeated inspections greatly increase the cost of inspection, since the double inspection at least doubles the time for the complete inspection. In addition, it is necessary to readjust and recalibrate the inspection equipment for each of these repeated inspections.

More recently, it has been proposed to simultaneously inspect the workpiece at multiple frequencies while making a single inspection of the workpiece. For example, reference may be had to U.S. Pat. No. 3,309,914, filed in the name of Fredrick G. Weighart, entitled Ultrasonic Inspection and assigned of record to Automation Industries, Inc. In such a system, pulses of ultrasonic energy are transmitted into the workpiece. Each of the pulses includes multiple components having different frequencies. The high frequency components are reflected back from any defects on or near the entrant surface whereas the low frequency components are effective to penetrate to and reflect from the rear of the workpiece.

The signals generated by the search unit as a result of the returning or received energy contain a similar number of components of differing frequencies. These signals are then filtered to separate them into the various respective components.

Such a system has been a substantial improvement over the prior art in that a single inspection of the workppiece may be made. Although such a system has been highly effective, it has certain limitations from a practical standpoint. For one thing, it has been difficult to focus the different components of the multifrequency energy.

SUMMARY

The present invention provides means for overcoming the foregoing difficulties whereby a workpiece can be simultaneously inspected with ultrasonic energy haaving multiple frequencies. This allows the workpiece to be scanned only once while insuring that even small defects on or near the entrant surface are accurately resolved as well as the defects at greater depth inside the workpiece.

In the embodiment of the present invention disclosed herein, this is accomplished by providing search unit means which scan the workpiece. The search unit means transmits a first series of low frequency pulses of ultrasonic energy and a second series of high frequency pulses of ultrasonic energy. The receiver includes two separate channels each one of which is individually responsive to the various pulses of the two different frequencies. Since the pulses in the two series are transmitted at relatively high repetition rates, for example, one thousand pulses per second, the workpiece is thoroughly inspected by the pulses of each frequency even though a high scanning speed is employed.

The outputs of the two channels are coupled to a cathode ray oscilloscope by suitable electronic switching whereby the two signals from the two channels are alternately gated to the oscilloscope. This can be used to generate a display which appears as a single signal or multiple displays juxtaposed to each other so as to represent different regions or zones in the workpiece. The resultant display is very simple and easy to understand and interpret.

DRAWINGS

DESCRIPTION

Figure 1:
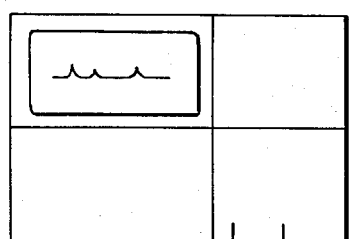
FIG. 1 is a diagrammatic representation of an ultrasonic nondestructive testing system embodying the present invention and particularly adapted for inspecting a workpiece shown in cross section.
Figure 1:
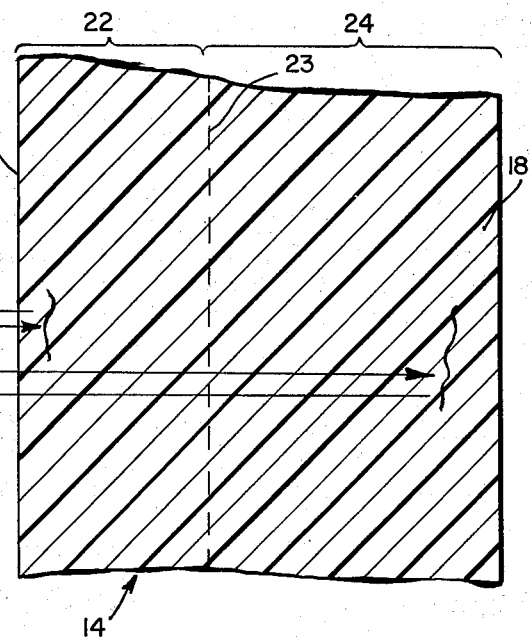

Referring to the drawings in more detail and particularly to FIG. 1 thereof, the present invention is embodied in an ultrasonic nondestructive testing system 10 for inspecting workpieces. The system 10 includes a search unit 12 adapted to scan the workpiece 14 from one side 16 thereof. This side 16 is frequently referred to as the front or entrant surface. As the search unit 12 scans across the surface 16 of the workpiece 14, it is effective to transmit pulses of ultrasonic energy into the surface 16 of the workpiece 14 and to receive echoes of these pulses reflected from the interior of the workpiece 14.

The workpiece 14 may be of any desired variety. However, the present invention is particularly adapted for measuring relatively thick objects comprised of a material or structure which is highly attenuative of ultrasonic energy. The front or entrant 16 of the workpiece 14 is normally readily available or accessible for inspection. However, the rear or back surface 18 may not be exposed or accessible. The space 20 between the two surfaces are separated from each other by a normally solid, integral material. It is this material which must be inspected.

The present system 10 is especially adapted for testing objects such as turbine rotors made of a material such as stainless steel, titanium, Inconel, Rene', Monel, etc. Materials of this nature are highly attenuative of ultrasonic energy. The amount of attenuation varies with frequency and increases very rapidly as the frequency increases above a range of about 5 or 10 megacycles.

For convenience and to facilitate the explanation of the present invention, the workpiece 14 may be considered as being subdivided into two or more imaginary zones or regions 22 and 24. The first zone is referred to herein as the surface or near surface zone 22 while the second zone is referred to as the intermediate and/or rear zone 24. Since these two zones 22 and 24 and the boundary 23 therebetween are imaginary, it is not believed their dimensions are particularly critical. As a consequence, the exact position and dimension of the boundary may be varied over a considerable range. However, the nature of the two zones 22 and 24 and the imaginary boundary 23, will be explained in more detail subsequently and particularly in connection with FIGS. 2a and 2b.

The first zone 22 includes the entrant surface 16 and at least the portion of the workpiece immediately behind the surface 16. In situations where the workpiece 14 is heavily stressed such as a turbine rotor, even very small defects like a fine crack in this zone 22 can very rapidly grow in size whereby a catastrophic failure occurs. Accordingly, it is essential all cracks of any nature in this zone 22 be accurately resolved.

In addition, whenever there are cracks, etc., in this zone 22 they are very frequently fine or small and located on the surface 16 or immediately below the surface 16. By way of example, in a turbine rotor it is generally necessary to be able to detect cracks which are situated within about 0.050 inches behind the surface.

In order to accurately resolve such defects and distinguish them from the entrant surface 16, it has been found necessary to employ ultrasonic frequencies in the region of at least ten megacycles or even higher.

If the workpiece 14 is comprised of a highly attenuative material, such as stainless steel, Inconel, etc., ultrasonic energy in a frequency range of ten megacycles or higher is very highly attenuated as it propagates through the material. By way of example, if a defect of about the minimum acceptable size is disposed at a depth of about one or 2 inches below the surface 16, it is very difficult, if not impossible, to accurately and reliably detect defects with ultrasonic energy of ten megacycles. At a depth of this amount, the attenuation losses are so great that if the amount of energy in the transmitted pulse is of a normal level if any echoes are returned they are to small to be reliably received, i.e., the signal-to-noise ratio is very low. If the energy in the transmitted pulse is increased in an attempt to increase the range of penetration the resolution, etc., is reduced because of the ringing of the crystal, "swamping" (i.e., overloading) of the receiver occurs.

However, it has been found that ultrasonic energy of a lower frequency (for example, in the range of 1 to 2.25 megacycles) is capable of penetrating through substantial amounts of material with acceptable amounts of attenuation. In fact, the energy can be reflected from the far side of such a workpiece as a substantial echo. The present invention provides a dual frequency system which is capable of transmitting ultrasonic energy at two different frequencies whereby echoes are reliably received from all parts of the workpiece. When the ultrasonic energy is in this low frequency range, it is very difficult to accurately resolve the differences between the entrant surface and a small crack adjacent the entrant surface. As a result, it has been very difficult if not impossible to use a single pulse of ultrasonic energy to resolve all types of defects in a thick, highly attenuative member.

Figure 7:
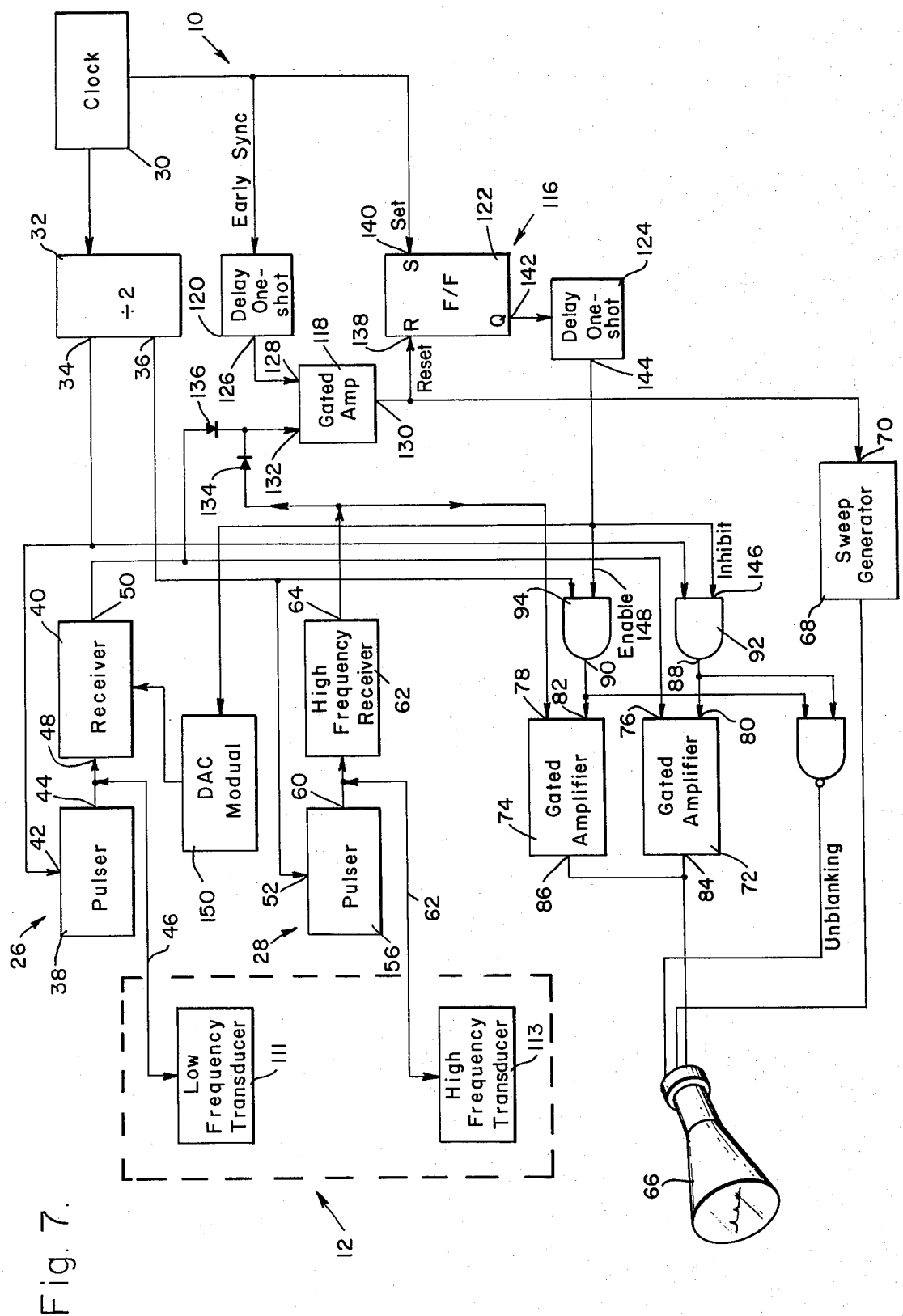
FIG. 7 is a block diagram of the ultrasonic nondestructive testing system of FIG. 1.

The system 10 may be best seen in FIG. 7. It includes two separate channels 26 and 28 for the two separate frequencies. A clock or pulse generator 30 is provided for producing a continuing series of clock pulses. These clock pulses are used to control the entire system 10 and synchronize the operation of the various parts thereof. The exact frequency of the clock pulses is not believed to be critical but may be on the order of about 2 kcs.

The clock is coupled to a divider 32 which is effective to divide the clock pulses into a pair of sync pulse trains. Each pulse train has a frequency that is one-half of the clock frequency. Also, the pulses in the two trains are 180° out of phase with each other, i.e., they occur alternately with each other.

By way of example, this divider 32 may be a square wave generator or flip-flop which reverses its state each time a clock pulse occurs on the input. One output 34 of the divider 32 is coupled to the first channel 26 to control its operation. The output 36 on the other side of the divider 32 is coupled to the other channel 28 to control its operation. This is effective to ensure the two channels 26 and 28 being synchronized with each other.

The two channels 26 and 28 are intended to transmit and receive ultrasonic energy in two or more different forms for penetrating into two or more different zones in the workpiece. In the present embodiment this is accomplished by using a high frequency for the close in or short range and a lower frequency for the far and longer range. However, one channel may be effective to use energy at a low intensity for the close in or short range while the second channel uses energy at a high intensity for the far or longer ranges. In this way the two channels are adpated to most effectively inspect their respective zones without limiting or degrading the inspection in the other zones.

The first channel 26 includes a pulser 38 and a receiver 40. The pulser 38 includes a control input 42 and signal output 44. The control input 42 is coupled to one side 34 of the divider 32 and is effective to cause the pulser 38 to produce a high voltage or driving pulse on the output 44. This pulse is normally a "wave packet", i.e., it includes several cycles of some predetermined frequency. By way of example, the pulse may include somewhere around 3 to 6 or more cycles. The frequency of these cycles will be explained in more detail subsequently, but by way of example, may be a low frequency on the order of about 2.25 megacycles or less.

The output 44 is coupled to the search unit 12. Although the search unit 12 may have a single transducer crystal therein, in this embodiment it includes two separate and distinct transducer crystals. These two crystals are free to operate completely independent from each other. The low frequency portion of the search unit 12 is coupled to the pulser 38 by means of a coaxial cable 46. Each time the pulse from the divider 32 triggers the pulser 38 the high voltage driving signal is coupled to the search unit 12. This is effective to energize the low frequency portion of the search unit 12 and cause it to transmit a pulse of low frequency ultrasonic energy.

The pulse of ultrasonic energy transmitted by the search unit 12 closely resembles the driving signal. More particularly, it includes several cycles of the same frequency as the driving pulse. The pulse of the ultrasonic energy is radiated from the search unit 12 in a beam, the profile of which is determined by the size and shape of the transducer, and any lens which may be present, etc.

Whenever any of this low frequency ultrasonic energy is incident upon an acoustical discontinuity, at least a portion thereof is reflected back toward the search unit 12. Usually the search unit 12 is separated from the workpiece 14 by some predetermined space which is filled with an acoustical couplant such as water. As a result, echoes will be reflected from the front or entrant surface 16, the rear surface 18 and any discontinuities in between.

Any echoes which are reflected back to the search unit 12 will cause the search unit 12 to produce a corresponding signal. These signals are coupled over the coaxial cable 46 back to the receiver 40. The receiver 40 which includes an input 48 and a video output 50 is effective to receive the signals from the search unit 12 and produce so-called video signals.

The received video signal includes a series of pulses. The first pulse may correspond to the "main bang"; i.e., this is the signal which corresponds to the transmission of the ultrasonic pulse. The second pulse normally corresponds to the echo from the entrant surface. At a time interval corresponding to the round trip flight time through the workpiece, there will be a pulse which corresponds to the echo from the rear surface. In addition, if there are any discontinuities inside of the workpiece 14, there will be a corresponding pulse or pulses between the front and rear pulses. The time delays between the successive echoes correspond to the distances to the discontinuities producing the echoes, and, accordingly, the time delays between the pulses corresponds to the distances to the reflecting discontinuities.

The opposite or second side 36 of the divider 32 is connected to the control input 52 of a second pulser 56 in the second channel 28. This pulser 56 is substantially the same as the preceding pulser 38 in the first channel in that it includes a control input 58 and output 60.

In this embodiment, the pulser 56 is tunned to a frequency which is different from the frequency of the first pulser 38. Each time a pulse is applied to the input 58, a driving signal is produced on the output 60 which includes several cycles. As explained in more detail subsequently, the frequency of these cycles are substantially different from the cycles of the first driving signal.

The output 60 of this pulser 56 is coupled to the high frequency portion of the search unit 12 by a coaxial cable 62. The search unit 12 thereby transmits a second pulse of ultrasonic energy corresponding to the second driving signal into the workpiece 14. Any echoes which are reflected back to the search unit 12 cause signals to be generated which are coupled to the receiver 62. This in turn results in a corresponding video signal being produced on the video output 64. This video signal also includes a series of pulses corresponding to the various reflecting discontinuities.

It may thus be seen that the clock 30 will produce a series of clock pulses having some preselected repetition frequency. The divider 32 which is responsive to the clock pulses is effective to divide the clock frequency in two and produce two series of sync pulses. These two series have a frequency which is one-half the repetition frequency of the clock pulses.

The first series of sync pulses is effective to trigger the first pulser 38 whereby the search unit 12 transmits the pulses of the first ultrasonic frequency into the workpiece 14 and receives the echoes therefrom. The receiver 40 in turn detects the signals whereby a video signal is produced on the video output 50.

The second series of sync pulses is effective to trigger the second pulser 56 whereby the search unit 12 transmits the pulses of the second ultrasonic frequency into the workpiece 14 and receives the echoes therefrom. As a consequence, the second video signal is present on the second output 64 of the receiver 62.

It should be appreciated that each of the two video signals includes a series of pulses corresponding to the echoes received by the respective receivers 40 and 62. The time displacements of the video pulses corresponds to the distance or range to the reflecting interfaces. The amplitudes of the video pulses are a function of the size of the interface and the amount of attenuation in the material.

Since the first video signal results from the ultrasonic energy of the lower frequency, the attenuation of this energy is less and the amplitude of the video pulses remains larger at the greater ranges. In contrast, since the second video signal results from the energy of the higher frequency, the attenuation is greater and the pulses in the second video signal are greatly attenuated, particularly at the greater ranges. In fact at ranges beyond the near surface zone the video pulses will normally be so small as to be of an unreliable nature, i.e., the signal-to-noise ratio will be very low.

The two video outputs 50 and 64 from the two receivers 40 and 62 may be coupled to some suitable utilizing means. In the present instance, this includes a cathode ray tube or oscilloscope 66. The oscilloscope 66 may be of a conventional design. It includes some form of horizontal deflection means for scanning the electron beam horizontally across the face of the tube together with some form of vertical deflection means for deflecting the electron beam vertically of the face of the tube. In addition, means such as a grid may be included for modulating the intensity of the electron beam. More particularly, this grid may be biased so as to effectively blank and unblank the beam.

The horizontal deflection means are coupled to means such as a sweep generator 68. The sweep generator is effective to generate a deflection signal which is in the form of a saw-tooth or ramp. The slope of the ramp is preferably linear whereby the horizontal sweep will be a direct linear function of time and the horizontal displacement along the face of the oscilloscope is a linear function of distance.

The control input 70 for the sweep generator 68 may be coupled to the output of the clock. This insures the oscilloscope producing a horizontal sweep each time an ultrasonic pulse is transmitted from the search unit 12 irrespective of whether the pulse is of a low frequency from the first channel or high frequency from the second channel.

Moreover, the sweep will be synchronized with the transmission of the pulse. If the sweep starts at the same time as or slightly before the transmission of the ultrasonic pulse, (i.e., the main bang) the first "blip" on the visual display will correspond to this main bang and the second blip will correspond to the front interface.

Under some circumstances, for example, the length of the water path varies, it may be desirable to use so-called interface gating to synchronize the operation of the sweep generator 68. In interface gating the control input 70 of the sweep generator 68 is coupled to the output of the receiver by a gate. The gate is normally biased "CLOSED" and is biased "OPEN" during a short interval when the front interface echo is expected.

This form of interface gating results in the sweep being initiated in synchronism with the front echo. As a result, the main bang is not present in the display and the front surface blip is in a fixed position on the display. As a result, all of the parts of the display are referenced to this blip or more particularly the front face 16 of the workpiece 14.

A pair of gated amplifiers 72 and 74 are provided for coupling the two receivers 40 and 62 to the vertical deflection means in the cathode ray oscilloscope 66. Each of these gated amplifiers 72 and 74 includes a signal input 76 and 78, a control input 80 and 82 and a signal output 84 and 86. The signal input 76 for the first gated amplifier 72 is coupled directly to the video output 50 of the first receiver 40. Similarly, the signal input 78 of the second gated amplifier 74 is coupled directly to the video output 64 of the second receiver 62. The two outputs 84 and 86 of the gated amplifiers 72 and 74 are joined together and coupled directly to the vertical deflection means in the cathode ray oscilloscope 66.

Figure 8:
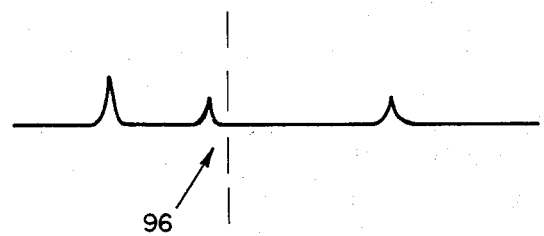
FIG. 8 is a representation of a typical display produced by the system of FIG. 1.

The control inputs 80 and 82 of the two gated amplifiers 72 and 74 are coupled to the outputs 88 and 90 of a pair of gates 92 and 94. These gates 92 and 94 are effective to alternately turn the gated amplifiers 72 and 74 "ON" and "OFF" in synchronism with certain preselected portions of the returning video signals from the two receivers 40 and 62. As a consequence, as the electron beams scans across the face of the oscilloscope 66, a signal trace 96 similar to that of FIG. 8 is generated. This trace 96 is a composite of the two video signals from the receivers 40 and 62 and includes a plurality of vertical deflections or blips spaced horizontally therealong.

The search unit 12 may be of any desired variety. As indicated before, the search unit 12 may have a single transducer crystal. However, in the present embodiment it has two separate transducer crystals similar to that disclosed and claimed in copending application Ser. No. 429487, filed Jan. 2, 1974, now abandoned, in the name of Jerry McElroy and assigned of record to Automation Industries, Inc.

Figure 3:
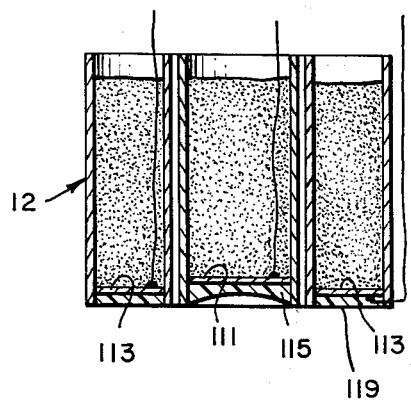
FIG. 3 is an end view of an ultrasonic search unit employed in the system of FIG. 1.
Figure 4:
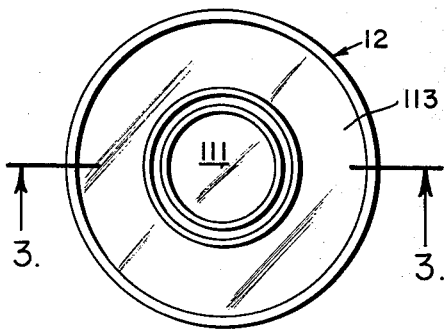
FIG. 4 is a vertical cross section of the search unit of FIG. 3, taken substantially along the plane of line 4—4.

The search unit 12 as best seen in FIGS. 3 and 4 includes a center transducer crystal 111 and an annular transducer crystal 113. Both transducer crystals 111 and 113 are effective to transmit a pulse of ultrasonic energy when an electrical signal is applied to the electrodes on the opposite sides thereof. Conversely, they are both effective to generate an electric signal when ultrasonic energy is incident thereon.

The center transducer crystal 111 is connected to the pulser 56 whereby it is effective to transmit and receive the high frequency energy. A lens 115 may be disposed in front of the crystal 111 for focusing the beam of ultrasonic energy.

The annular transducer crystal 113 is disposed concentrically around the center crystal 111. It may also have a suitable lens 119 for focusing its beam. The annular crystal 113 is connected to the pulser 38 whereby it transmits and receives the low frequency ultrasonic energy.

It may be seen that these two crystals have beam patterns which are concentric and essentially cover the same volume of material. The two crystals 111 and 113 are effective to operate separately and independently from each other. Accordingly, each one may be designed to operate most effectively at its extended frequency.

Figure 2A:
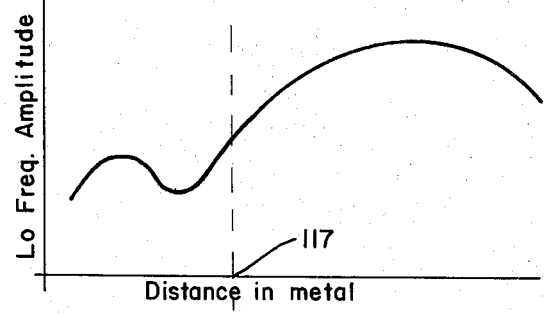
FIG. 2a and 2b illustrates two sets of response characteristics of the system of FIG. 1 as compared to the workpiece.
Figure 2B:
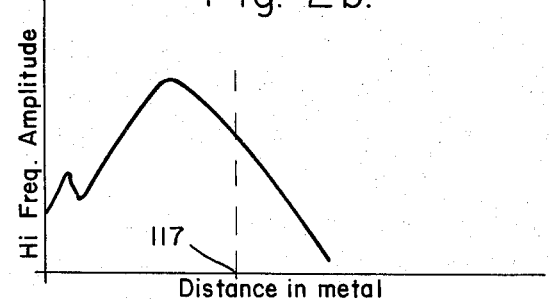

The response characteristics of the center crystal are best seen in the graph of FIG. 2b. It may be seen from this graph that at the distance 117 the response is rapidly decreasing. This is in the far field for the crystal and the attenuation in the workpiece 14 is becoming larger.

FIG. 2a shows the response of the annular crystal 113. At the distance 117 this is just outside the near field for the crystal and as a result the response is still increasing. Since the attenuation at this low frequency is considerably less, the response of the crystal remains high all the way to the backside of the workpiece 14. It should be noted that the DAC module 150 may be used to make the response characteristics of the system essentially flat beyond the distance 115.

The boundary 23 which separates the surface or near surface zone 22 from the back zone 24 is arbitrarily at the desired distance. Normally it is set at about the distance 117 whereby the low frequency transducer crystal 113 is only operative for ranges beyond the effective range of the crystal 111.

Figure 5:
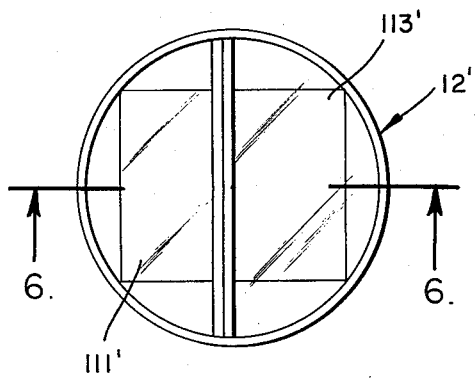
FIG. 5 is an end view of another form of ultrasonic search unit for use in the system of FIG. 1.
Figure 6:
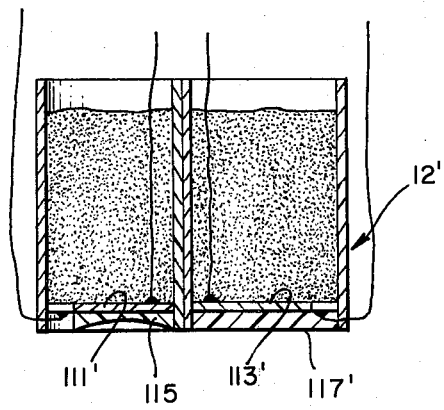
FIG. 6 is a vertical cross-sectional view of the search unit of FIG. 5, taken substantially along the plane of line 6—6.

As an alternative the search unit 12' may be used (FIGS. 5 and 6). This search unit 12' employs two separate crystals 111' and 113'. These are high and low frequency crystals similar to the crystals 111 and 113. However, instead of being concentric, they are disposed side-by-side. These crystals are effective to operate independently of each other. They can also be focused by a lens 115' and/or 117'.

This search unit 12' is effective to operate essentially the same as the search unit 12 and has essentially the same type of response characteristics.

It should be noted that although the search unit is disclosed as having two separate transducer crystals, it may be only one crystal. The one single crystal can be arranged to transmit and receive ultrasonic energy of two different frequencies, particularly if it has a somewhat lower "Q". In this event a suitable time sharing arrangement may be provided for switching between the two receiving channels.

The first one-shot delay 120 is coupled to the clock 30 so as to be responsive to the clock pulses. Each time a clock pulse occurs, the delay 120 produces a single square wave pulse on the output 126. The duration of this square wave normally is sufficiently long to persist beyond the main bang but terminates just before the first echo signal corresponding to the front surface 16 of the workpiece 14.

The output 126 of the delay 120 is coupled to one of the control inputs 128 on the gated amplifier 118. The presence of the square wave on the input 128 is effective to bias the gated amplifier 118 CLOSED whereby no signal will appear on its output 130. In the absence of the square wave pulse on the input 128, the gated amplifier 118 is biased OPEN and any signals occurring on the input 132 will pass through the amplifier 118 to the output 130.

The input 132 is connected to the outputs 50 and 64 of the receivers 40 and 62, respectively, by diodes 134 and 136. It may be appreciated that each time one of the pulses 38 or 56 produces a trigger pulse, the gated amplifier 118 is biased CLOSED by the delay pulse on input 128. However, whenever either of the receivers 40 or 62 receives the first echo signal corresponding to the front surface of the workpiece 14, the delay pulse on input 128 has expired and the gated amplifier 118 is OPEN. As a result, a corresponding interface pulse will appear on the output 130.

The output 130 is coupled to the control input 70 of the sweep generator 68. This is effective to cause the horizontal scan of the oscilloscope 66 to be synchronized with the echo from the front 16 of the workpiece 14. As a consequence, the horizontal distance along the sweep will be in a predetermined, constant relationship to the depth within the workpiece 14.

The output 130 is also coupled to the reset input 138 of the flip-flop 122. The set input 140 is coupled to the output of the clock 30 whereby each time a clock pulse occurs the flip-flop 122 is "SET". When the interface signal from the gated amplifier 118 occurs on the input 138, the flip-flop 122 is "RESET". At that instant, a pulse will occur on the output 142.

It can be appreciated that this pulse on output 142 will occur substantially simultaneously with the occurrence of the front echo signal. This is true irrespective of whether the signal results from a low frequency pulse triggered by the pulser 38 or a high frequency pulse triggered by the pulser 56.

Each time the flip-flop 122 is "RESET," it produces a pulse on output 142 which triggers the one-shot delay 124. This, in turn, produces a square wave pulse of a predetermined duration on its output 144. It can be appreciated this pulse starts as a result of the echo from the front surface 16. It lasts for an interval which corresponds to the thickness of the surface or near surface zone 22.

The output of the one-shot delay 124 is coupled to the control inputs on the pair of gates 92 and 94. The other input on the gate 92 is coupled to the output 34 of the divider 32, while the other input on the gate 94 is coupled to the output 36 of the divider 32.

When the delay 124 produces a pulse on the inputs 146 and 148 and the sync pulse which triggers the high frequency pulser 56 occurs, the gate 94 applies a signal to the input 82 whereby the gated amplifier 74 is OPEN and the signal from the receiver 62 passes through to the output 86 to the oscilloscope 66. The delay pulse on the input 146 inhibits the gate 92 during this interval whereby no signals on output 50 of receiver 40 will pass through the gated amplifier 72. When the delay pulse on input 148 expires, the gate 94 biases the gated amplifier 74 CLOSED, and no signals are coupled to the oscilloscope.

Conversely, when the delay pulse is present on inputs 146 and 148 and the sync pulse which triggers the low frequency pulser 38 occurs, the gate 92 applies a signal to the input 80 whereby the gated amplifier 72 is biased CLOSED until the delay pulse expires. When this delay pulse expires the gated amplifier 72 is biased OPEN and the signal on the output 50 of the low frequency receiver 40 passes to the oscilloscope 66. Throughout this entire interval the gated amplifier 74 is biased CLOSED.

It may thus be seen that when the divider 32 produces a sync pulse on output 36 and the high frequency channel 28 is active, the signal on the output 64 of receiver 62 will be coupled through the gated amplifier 74 only during the existence of the delay pulse from the one-shot delay 124. Conversely, on the alternate intervals when there is a signal on output 34 and channel 26 is active, the gated amplifier 72 is only biased OPEN during the delay pulse. As a result, the high and low frequency pulses are passed to the oscilloscope 66.

In order to use the present system the search unit 12 scans across the surface 16. The clock 30 periodically produces a sequence of clock pulses which are applied to the divider 32. The divider 32 produces two sequences of sync pulses which alternate with each other and alternately trigger the pulsers 38 and 56.

The pulser 38 is effective to trigger the low frequency transducer portion of the search unit 12. This causes a pulse of low frequency ultrasonic energy to be transmitted into the workpiece 14 with any echoes being reflected back to the search unit 12 whereby a corresponding signal is received by the receiver 40 and coupled from the signal output 50 to the gated amplifier 72.

On the alternate pulses, the pulser 56 drives the high frequency transducer portion of the search unit 12 whereby the pulses of high frequency energy are transmitted into the workpiece 14 and any echoes of the reflected energy are received by the same portion. The resultant signals are received by the receiver 62 whereby a signal on the output 64 is coupled to the gated amplifier 74.

Each time either pulser 38 or 56 is triggered, the clock pulse is coupled to the first one-shot delay 120. This is effective to produce a square wave pulse of predetermined duration on the input 128 of the gated amplifier 118. Each time a front interface echo is reflected from a front interface 16 of the workpiece 14, a signal is applied to the second input 132 of the gated amplifier 118. As a consequence, the gated amplifier 118 is effective to RESET the flip-flop 122 coincident with the front interface signal.

Each time the flip-flop 122 is RESET it triggers the one-shot delay 124 which produces a square wave delay pulse. This delay pulse has a time duration corresponding to the range or distance to the separation between the near surface zone 22 and the far surface zone 24. This delay pulse is applied to the two gates 92 and 94. Each time the channel 26 is active and the low frequency pulse is transmitted, the gate 92 inhibits the gated amplifier 72 and keeps it biased CLOSED for the time corresponding to the thickness of the near zone 22. At the expiration of this time, the gated amplifier 72 is OPEN so that any received low frequency signal from the receiver 40 is coupled through the amplifier 72 to the cathode ray oscilloscope 66.

On the alternate cycles, when the channel 28 is active and the high frequency pulse is transmitted, the gate 94 maintains gated amplifier 74 OPEN during the existence of the delay pulse. As a result, any of the high frequency signals occurring during this interval are coupled through the gated amplifier 74 to the cathode ray oscilloscope 66.

It will thus be seen that on alternate cycles the near zone or high frequency signals are displayed during the initial part of the sweep and the far zone or low frequency signals are displayed during the terminal part of the sweep. As a consequence, the low frequency and high frequency signals are combined into a single display on the face of the cathode ray oscilloscope. An operator viewing this display will not be able to discern the fact that there are two separate portions which are alternately generated. However, in the near field zone the results are produced by high frequencies and have a high degree of accuracy and resolution. In addition, the far zone is produced by the low frequency pulses and as a consequence has very little attenuation or loss of amplitude with the extended ranges. If it is desired to compensate for the attenuation, a DAC module 150 may be employed. This is a distance amplitude correction module which is triggered by the start of the delay pulse from the one-shot delay 124. The DAC module 150 is effective to increase the gain of the receiver 40 with time according to the attenuation rate whereby the losses from attenuation are compensated for.

It will thus be seen that the present system provides an extremely accurate system with a high degree of resolution but is still capable of fully inspecting even thick objects having highly attenuative materials.

Only one embodiment of the invention has been disclosed herein. However, it will be readily apparent to persons skilled in the art that numerous changes and modifications may be made hereto without departing from the spirit of the invention.

For example, the search unit is disclosed as having two separate transducer crystals. However, a single transducer crystal may be employed that is capable of transmitting ultrasonic energy of two different frequencies. Suitable electronic switching means may then be provided for alternately switching the search unit between the two channels.

It should also be noted that the alternate pulses of ultrasonic energy are described as being of two frequencies. However, it has been found that the same concept may be employed by making the alternate pulses of one frequency but of different intensity. For example, a higher frequency may be employed. One series of pulses are suitable for inspecting the surface or near surface zone 22. The other series of pulses are then of a sufficient magnitude to insure the higher frequency pulse penetrating to the far side 18 of the workpiece. Although this higher intensity pulse may tend to temporarily swamp or block the receiver, it will have recovered by the time the echoes are returning from the far zone 24.

Having thus described the invention what is claimed is:

1. A nondestructive testing system for inspecting a workpiece, said system including the combination of
   a search unit for being acoustically coupled to said workpiece and for scanning said workpiece,
   a clock for generating a series of clock pulses,
   a divider coupled to said clock for dividing said series of clock pulses into a first series of synchronizing pulses and a second series of synchronizing pulses, the pulses in said first and second series alternating with each other,
   a first pulser coupled to said divider and responsive to the synchronizing pulses in said first series, said pulser being coupled to said search unit and effective to cause said search unit to transmit ultrasonic energy of a first frequency into said workpiece in response to the synchronizing pulses in said first series,
   a second pulser coupled to said divider and responsive to the synchronizing pulses in said second series, said pulser being coupled to said search unit and effective to cause said search unit to transmit ultrasonic energy of a second frequency into said workpiece in response to the synchronizing pulses in said second series,
   said search unit being effective to receive echoes of said ultrasonic energy and produce a first series of signals of said first frequency and a second series of signals of said second frequency,
   a first receiver coupled to said search unit and responsive to said signal of said first frequency,
   a second receiver coupled to said search unit and responsive to said signal of said second frequency,
   a cathode ray oscilloscope for producing a visual display of signals coupled thereto, and
   means for coupling said cathode ray oscilloscope to said first receiver in response to the synchronizing pulses in said first series and for coupling said cathode ray oscilloscope to said second receiver in response to the synchronizing pulses in said second series whereby said oscilloscope produces a combined display of said signals.

2. The nondestructive testing system of claim 1 including
   distance amplitude correction coupled to one of said receivers for varying the gain thereof as a function of the range for said receiver 3. The nondestructive testing system of claim 2 including
   at least one "AND" gate in said means for alternately coupling said receivers to said oscilloscope.

4. The nondestructive testing system of claim 1 wherein said search unit includes
   a first transducer coupled to said first pulser and receiver and responsive to said first frequency, and
   a second transducer coupled to said second pulser and receiver and responsive to said second frequency.

5. The nondestructive testing system of claim 1 including
   a sweep generator coupled to said clock and to said oscilloscope for sweeping the electron beam across the face of said oscilloscope in synchronism with the timing pulses, and gate means coupled to said receivers and effective to alternately couple said receivers to said oscilloscope.

6. The nondestructive testing system of claim 5 including
means for blanking and unblanking said oscilloscope during preselected portions of said sweep.

7. A nondestructive testing system for inspecting a workppiece, said system including the combination of
an ultrasonic search unit for transmitting ultrasonic energy in response to a driving signal and producing a received signal in response to ultrasonic energy received by said search unit, said search unit being adapted to be acoustically coupled to said workpiece for scanning said workpiece,
a clock for generating a series of timing pulses,
a divider coupled to said clock for dividing said series of timing pulses into a first series of odd synchronizing pulses and a second series of even synchronizing pulses, said odd and even synchronizing pulses alternating with each other,
a first pulser coupled to said divider and effective to produce a first series of driving signals in response to the synchronizing pulses in said odd series, said pulser being coupled to said search unit and effective to cause said search unit to transmit pulses of ultrasonic energy of a first frequency into said workpiece in response to said driving signal,
a second pulser coupled to said divider and effective to produce a second series of driving signals in response to the synchronizing pulses in said even series, said second pulser being coupled to said search unit and effective to cause said search unit to transmit pulses of ultrasonic energy of a second frequency into said workpiece in response to said driving signals,
said search unit being effective to receive echoes of said pulses of ultrasonic energy from said workpiece and produce a first series of signals of said first frequency and a second series of signals of said second frequency,
a first receiver coupled to said search unit, said first receiver being responsive to said signal of said first frequency and effective to produce a received signal corresponding thereto,
a second receiver coupled to said search unit, said second receiver being responsive to said signal of said second frequency and effective to produce a received signal corresponding thereto,
a cathode ray oscilloscope for producing a visual display of signals coupled thereto,
a sweep generator coupled to said cathode ray oscilloscope for scanning the electron beam across the face thereof,
gate means for coupling said first receiver to said cathode ray oscilloscope in response to said odd synchronizing pulses,
gate means for coupling said second receiver to said cathode ray oscilloscope in response to said even synchronizing pulses, and
means for "blanking" and "unblanking" the electron beam in said oscilloscope in response to said synchronizing pulses whereby said oscilloscope produces a single combined display of said first and second signals.

* * * * *